United States Patent
Lozano (10) Patent No.: US 6,920,118 B2
(45) Date of Patent: Jul. 19, 2005

(54) METHOD AND APPARATUS FOR COMMUNICATING HETEROGENEOUS DATA TRAFFIC

(75) Inventor: Angel Lozano, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 750 days.

(21) Appl. No.: 09/742,669

(22) Filed: Dec. 20, 2000

(65) Prior Publication Data

US 2002/0075831 A1 Jun. 20, 2002

(51) Int. Cl.$^7$ .............................. H04J 7/204; H04J 3/00; H04Q 7/00
(52) U.S. Cl. ...................... 370/329; 370/335; 370/336; 370/342; 370/345; 370/437; 370/441; 370/442
(58) Field of Search ........................ 370/329, 335–337, 370/340–342, 345, 347, 348, 437, 441–444, 458, 465, 479, 498

(56) References Cited

U.S. PATENT DOCUMENTS

| | | | | |
|---|---|---|---|---|
| 5,373,502 A | * | 12/1994 | Turban ....................... | 370/441 |
| 5,511,068 A | * | 4/1996 | Sato ........................... | 370/335 |
| 6,009,087 A | * | 12/1999 | Uchida et al. .............. | 370/335 |
| 6,122,270 A | * | 9/2000 | Whinnett et al. ........... | 370/342 |
| 6,181,684 B1 | * | 1/2001 | Turcotte et al. ............. | 370/332 |
| 6,711,144 B1 | * | 3/2004 | Kim et al. ................... | 370/335 |

FOREIGN PATENT DOCUMENTS

EP 0 876 008 A1 * 4/1998 ............ H04B/7/26

* cited by examiner

Primary Examiner—Seema S. Rao
Assistant Examiner—Robert C. Scheibel, Jr.

(57) ABSTRACT

Method and apparatus for communicating heterogeneous data traffic simultaneously using a hybrid Code Division Multiplexing (CDM)/Code Division Multiple Access (CDMA)-Time Division Multiplexing (TDM)/Time Division Multiple Access (TDMA) system which communicates data on a per data type basis, rather than a per user or per channel basis. A transmitter accepts a plurality of data streams, each of which includes either Constant Bit Rate Data (CBR) or Variable Burst Rate Data (VBR), where CBR is characterized by a steady data rate and strict latency requirements and VBR is characterized by a variable data rate with large peaks and lulls and loose latency requirements. The system identifies each input data stream as CBR or VBR. CBR data is spread using CDM/CDMA with an appropriate spreading factor for CBR, whereas VBR data is modulated/encoded and interleaved with CDM/CDMA with an appropriate spreading factor for VBR and TDM/TDMA, respectively. The modulated CBR data and VBR data streams are then transmitted by the transmitter to a receiver, which receives and demodulates the received data streams to recover the original CBR data and VBR data streams. By communicating input data streams based on whether they include CBR data or VBR data, the communication system is able to communicate CBR data and VBR data simultaneously while achieving a superior Quality-of-Service.

26 Claims, 6 Drawing Sheets

FIG. 4 ns system.

METHOD AND APPARATUS FOR COMMUNICATING HETEROGENEOUS DATA TRAFFIC

FIELD OF THE INVENTION

The present invention generally relates to the field of telecommunications and digital communication systems and, more particularly, to the communication of heterogeneous, e.g., voice, video, and data traffic via a method and apparatus that uses Time Division Multiplexing (TDM)/Time Division Multiple Access (TDMA) and Code Division Multiplexing (CDM)/Code Division Multiple Access (CDMA) to communicate multiple voice, video, and data traffic streams simultaneously in a single communications system.

BACKGROUND OF THE INVENTION

With the advent of the digital telecommunications era, digital communication systems handle a wide array of data traffic generated by a plurality of users and applications. These users and applications generate voice, video, and data traffic that communication systems must communicate simultaneously. To communicate different traffic types simultaneously, digital communication systems must ensure that requirements such as latency (the delay time between the data source and the data destination, throughput (the data bandwidth), and error rate (the frequency of miscommunicated data), are satisfied for each traffic type in order to guarantee a sufficient Quality-of-Service. Satisfying these requirements while communicating different traffic types simultaneously is difficult, however, in light of the fact that each type has its own requirements, thereby placing great demands on communication system design. Thus, there is a high demand for digital communication systems that are able to communicate multiple data traffic types simultaneously while maintaining a sufficient Quality-of-Service.

Distinct types of data traffic can be categorized into two classes according to their requirements. The first class, known as Constant Bit Rate Data, is best represented by voice. Data traffic within the Constant Bit Rate Data class has a number of common features, including a stable data rate, stringent latency requirements, and exact uplink/downlink symmetry for voice applications. The stable data rate is characterized by a constant data stream with minimal variance between minimum and maximum data transmission rates. Stringent latency requirements necessitate data transmission and reception with minimal delay, because delays interfere with the constant data stream and corrupt the data communication.

In contrast, the second data type class, Variable Burst Rate Data, has features dissimilar to Constant Bit Rate Data. Common features among the Variable Burst Rate Data class include variable data rates, loose latency requirements, and a strong uplink/downlink asymmetry. The variable data rates, characterized by a large variance between the minimum and maximum data transmission rates, lead to large peaks and lulls in data communication. The loose latency requirement permits large transmission and reception delays between data packets without corrupting the data stream.

Comparing the Constant Bit Rate Data and Variable Burst Rate Data classes, a number of things are apparent. A communication system communicating Constant Bit Rate Data can have a relatively narrow data bandwidth variance due to the small variance in the data communication rate for Constant Bit Rate Data. This advantage, however, is limited by the strict latency and exact uplink/downlink symmetry requirements for Constant Bit Rate Data, which require the communication system to communicate data without delay. In contrast, a communication system communicating Variable Burst Rate Data can withstand long communication delays of asynchronous data. The large data rate variance of Variable Burst Rate Data, however, requires the communication system to have a wide data bandwidth variance that will withstand large communication rate peaks and lulls.

In attempting to design a communication system that can efficiently transmit both Constant Bit Rate Data and Variable Burst Rate Data from multiple users while guaranteeing a satisfactory Quality of Service, a number of data communication methods have been attempted, including Time Division Multiplexing (TDM)/Time Division Multiple Access (TDMA), Code Division Multiplexing (CDM)/Code Division Multiple Access (CDMA), Frequency Division Multiple Access (FDMA), and hybrid systems combining these methods. Unfortunately, TDM/TDMA, CDM/CDMA and FDM/FDMA systems do not effectively communicate Constant Bit Rate Data and Variable Burst Data simultaneously. TDM/TDMA systems can efficiently communicate Variable Burst Data, which can withstand high latency periods and asynchronous uplink/downlink, but cannot efficiently communicate Constant Bit Rate Data, due to small time slot lengths and fixed TDM/TDMA header overhead. CDM/CDMA systems without variable spreading factors eliminate TDM/TDMA latency problems for Constant Bit Rate Data by communicating individual data streams simultaneously in a single time slot, but suffer from high data aggravation limitations due to a large peak-to-average power variance caused by Variable Burst Data. CDM/CDMA systems with variable spreading factors reduce the peak-to-average power and its associated aggregation issues, but introduce power interference issues, as peak Variable Burst Rate Data streams overpower minimum power Variable Burst Rate Data streams and Constant Bit Rate Data streams. FDM/FDMA systems communicate Constant Bit Rate Data and Variable Burst Rate Data, but cannot maintain a sufficient Quality-of-Service because of dynamic bandwidth allocation issues.

In an attempt to compensate for the failings of CDM/CDMA, TDM/TDMA, and FDM/FDMA systems, which communicate Constant Bit Rate Data and Variable Burst Rate Data simultaneously, the prior art has combined CDM/CDMA and TDM/TDMA to form hybrid communication systems. In summary, the prior art involves hybrid CDMA-TDMA systems that boost transmission efficiency by using CDMA to utilize the entire frequency spectrum when transmitting data, and by using TDMA to interleave data transmissions. All of these hybrid CDMA-TDMA methods and systems, however, encode and multiplex data on a per user basis, rather than a per data type basis. As a result, when users transmit Constant Bit Rate Data and Variable Burst Rate Data simultaneously, these systems suffer from limitations and inefficiencies caused by transmitting Constant Bit Rate Data and Variable Burst Rate Data simultaneously. More specifically, in these hybrid CDMA-TDMA systems, Constant Bit Rate Data multiplexed using TDMA experiences delays which degrade signal latency, while Variable Burst Rate Data encoded using CDMA experience aggregation problems caused by a large peak-to-average power variance, and near-far power control problems caused by burst data traffic. Thus, even these hybrid CDMA-TDMA systems fail to provide a sufficient Quality-of-Service to communicate Constant Bit Rate Data and Variable Burst Rate Data simultaneously.

SUMMARY OF THE INVENTION

In accordance with the principles of the invention, data in a CDM/CDMA system is spread using different spreading codes on a per-data-type basis, e.g., a first spreading code is used for CBR and a second spreading code is used for VBR.

Unlike the prior art, the present invention encodes and multiplexes individual data traffic on a per traffic type basis rather than a per user basis. When users transmit voice, video, and audio data traffic simultaneously, the data traffic is divided into individual data streams and classified based on their data type. Each data stream is transmitted using either CDM/CDMA with a CBR spreading factor, or CDM/CDMA with a VBR spreading factor in combination with TDM/TDMA, based on whether the data stream is Constant Bit Rate Data, or Variable Burst Rate Data, respectively. Thus, a user who transmits voice, video, and audio data traffic simultaneously will experience superior Quality-of-Service, and does not suffer the limitations and inefficiencies of prior hybrid systems, which do not discriminate between Constant Bit Rate Data and Variable Burst Rate Data.

The present invention addresses these and other limitations and inefficiencies caused by simultaneous communication of two different data types, i.e., Constant Bit Rate Data (on "CBR") and Variable Burst Rate Data (on "VBR"). The present invention is a method and apparatus for communicating CBR data and VBR data simultaneously, using CDM/CDMA with a spreading factor appropriate for CBR (hereinafter called a "CBR spreading factor") to communicate CBR data and using CDM/CDMA with a spreading factor appropriate for VBR (hereafter called "VBR spreading factor") to communicate VBR data. These data streams are communicated separately, thereby comprising a hybrid TDM/TDMA-CDM/CDMA system which communicates data on a per data type basis, i.e., CBR data or VBR data, rather than a per user basis.

In one embodiment of the invention, a transmitter accepts a plurality of data streams, whose data types include CBR data and VBR data. The transmitter identifies the data class for each data stream as CBR data or VBR data. CBR data using CDM/CDMA is spread with a CBR spreading factor, thereby creating CDM/CDMA CBR data (CBR-CDMA data), while VBR data is spread using CDM/CDMA with a VBR spreading factor. If multiple VBR streams are to be transmitted, they are interleaved using TDM/TDMA, thereby creating CDM/CDMA VBR data (VBR-CDMA data) or CDM/CDMA-TDM/TDMA VBR data, where either CDMA and TDMA can be applied first (hence, VBR-CDMA-TDMA data or VBR-TDMA-CDMA data). The CBR and VBR spreading factors should in general be different from each other. Moreover, in one embodiment, because TDMA is embedded within CDM/CDMA, the CBR and VBR spreading factors can be the same. The spread signals are transmitted to the receiver within the same frequency band.

Upon receipt of the signals, the receiver despreads the CDM/CDMA CBR data with the appropriate CBR spreading codes to recover the individual data streams of CBR data and similarly despreads and, where TDM/TDMA has been applied, as well as deinterleaves the CDM/CDMA-TDM/TDMA VBR data, using CDM/CDMA with the appropriate VBR spreading codes and TDM/TDMA to recover the individual data streams of VBR data.

Advantageously, use of CDM/CDMA with a CBR spreading factor communicates CBR data efficiently and satisfies the constant data rate and strict latency requirements to guarantee a sufficient Quality-of-Service.

Further advantageously, use of CDM/CDMA with a VBR spreading factor and TDM/TDMA to transmit VBR data communicates VBR data efficiently and satisfies the variable data rate, loose latency symmetry requirements to guarantee a sufficient Quality-of-Service. The TDM/TDMA time slots allocated to individual VBR data streams interleave multiple data streams orthogonally thereby eliminating peak-to-average power and power interference problems. In addition, VBR data can withstand the latency imposed by a TDM/TDMA system due to individual time slots.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

In any embodiment according to this invention, the appropriate CBR spreading factor is determined and fixed. The VBR spreading factor, on the other hand, depends on the amount of the VBR traffic: the more VBR traffic, the smaller the factor. At the same time, the smaller the VBR factor, the fewer CBR users that can be supported. Hence, the VBR spreading factor is a parameter that determines the trade-off of how much of both types of traffic has to handled. That parameter need not be fixed, e.g., it could be periodically adjusted to the traffic profile. In addition, the VBR spreading factor can depend only on the total amount of VBR traffic and on the number of CBR users. The number of VBR users need not enter into the trade-off. The number of VBR users that can share the VBR signal is determined by how that signal is partitioned in time slots, independently of the spreading factors.

More particularly, the spreading factor for the CBR streams is readily determined from the data rate required by the corresponding application. A voice telephony session, for instance, requires a data rate on the order of 10 Kbps, which can be attained with a relatively large spreading factor (64 is a commercial value in IS_95 CDMA). A video session would require a higher data rate and thus a smaller spreading factor, etc. The method of determining the spreading factor for CBR signals is known to those of ordinary skill in the art, for example, as based on the required data rate and the chip rate of the system, which is a parameter that is given by the available bandwidth. From the spreading factors, the transmit power required by every stream can be also calculated easily given some target Signal-to-Interference Ratio (SINR), the interference level, and the location of the corresponding terminal. Since the CBR signals have strict requirements in terms of service, they should be allocated power first. Once they all have their required power, whatever power is left from the available power budget is allocated to the VBR signal. The spreading factor on the VBR signal is then adjusted, on a slot-by-slot basis, so that the VBR users can also meet their target SINR given their levels of interference, location, and data rate. Notice that every slot corresponds to a different VBR data stream, thus the need to vary (possibly) the VBR spreading factor. Also, the power requirements of the CBR users will vary over time and that will cascade into a variation in the leftover power for VBR and thus into the corresponding spreading.

Figure 1:
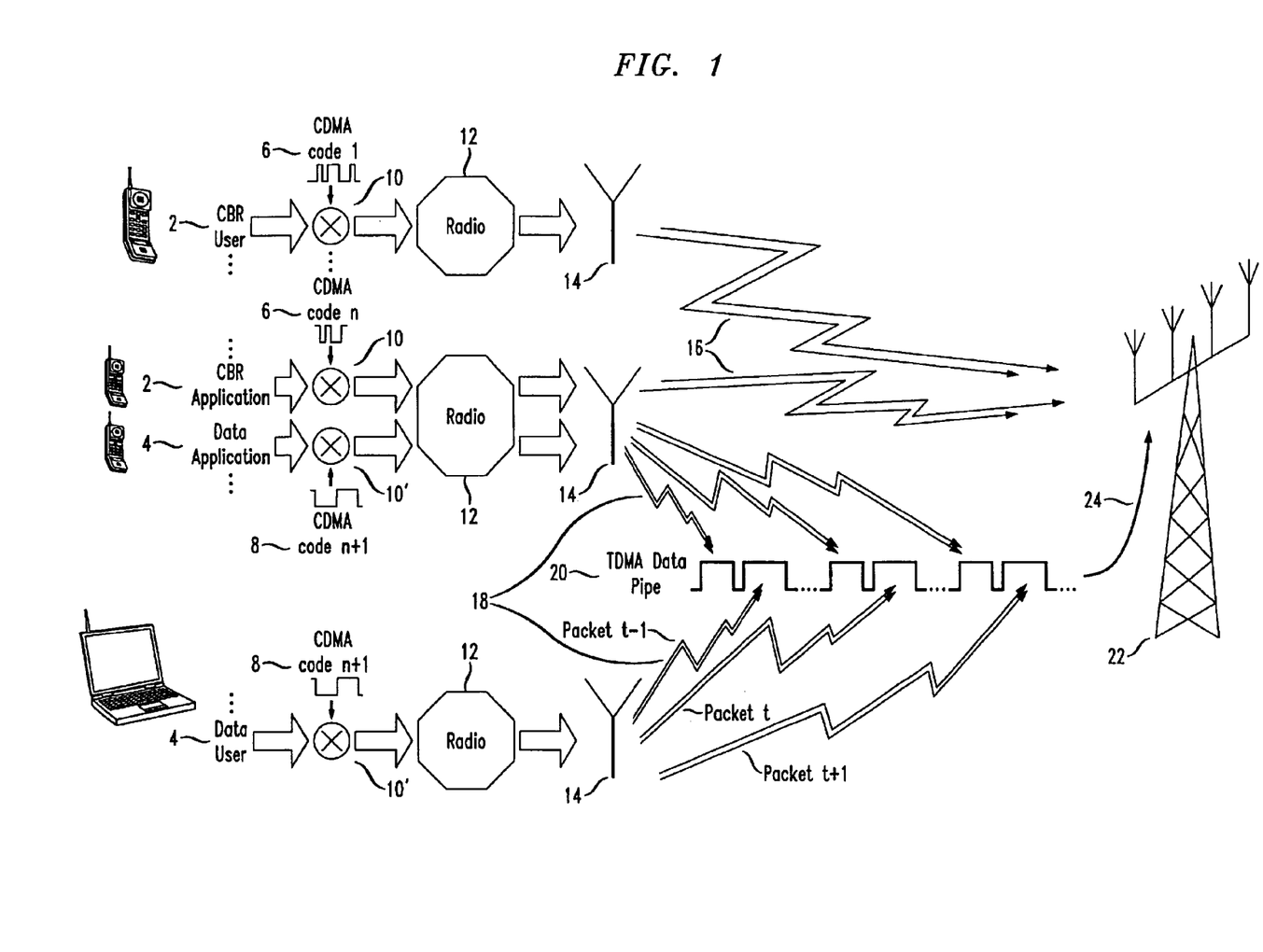
FIG. 1 is a diagram of the data transmission architecture for a multiple access implementation of the present invention.

The architecture of a multiple access (implying many transmitters and a single receiver) implementation of the present invention is shown in FIG. 1. In the multiple access architecture, the transmitters first spread VBR data using CDMA with a VBR spreading factor, thereby creating VBR-CDMA data. The transmitters then upconvert the VBR-CDMA data to the appropriate RF carrier frequency and perform the TDMA interleaving by bursting the VBR-CDMA RF data transmissions at individual time slots within the allocated VBR-CDMA bandwidth, thus transmitting VBR-CDMA-TDMA data.

Referring now to FIG. 1, the input to the transmitter includes CBR data streams 2 and VBR data streams 4. As shown, CBR data 2 and VBR data 4 are input by multiple users and applications.

CBR data streams 2 are spread with modulator 10 using CDMA with a CBR spreading factor 6 to create CBR-CDMA data. The transmitters upconvert these CBR-CDMA data streams from baseband to RF with RF modulator 12. The CBR-CDMA RF data then passes to antennas 14, which transmit the CBR-CDMA RF data.

VBR data streams 4 are spread by modulator 10' using CDMA with a VBR spreading factor 8 to create VBR-CDMA data. The transmitters upconvert the VBR-CDMA data from baseband to RF in RF modulator 12. The VBR-CDMA RF data then passes to antennas 14, which transmit the VBR-CDMA RF data. The notation of code 1, code n and code n+1 indicates simply that these values are different.

When the transmitters transmit VBR-CDMA RF data over the physical channels 24, the transmitters transmit the VBR-CDMA RF data in bursts of VBR-CDMA RF data packets 18 at specified intervals in individual time slots. Thus, multiple VBR-CDMA RF data streams are interleaved using TDMA into a single TDMA signal 20 that includes VBR-CDMA-TDMA data.

The receiver antenna 22 receives the superposition of all RF signals (16 and 24). The resulting received signal is processed to recover the original CBR data streams and VBR data streams. These data streams are then sent by the receiver system to the appropriate users and applications.

Figure 2:
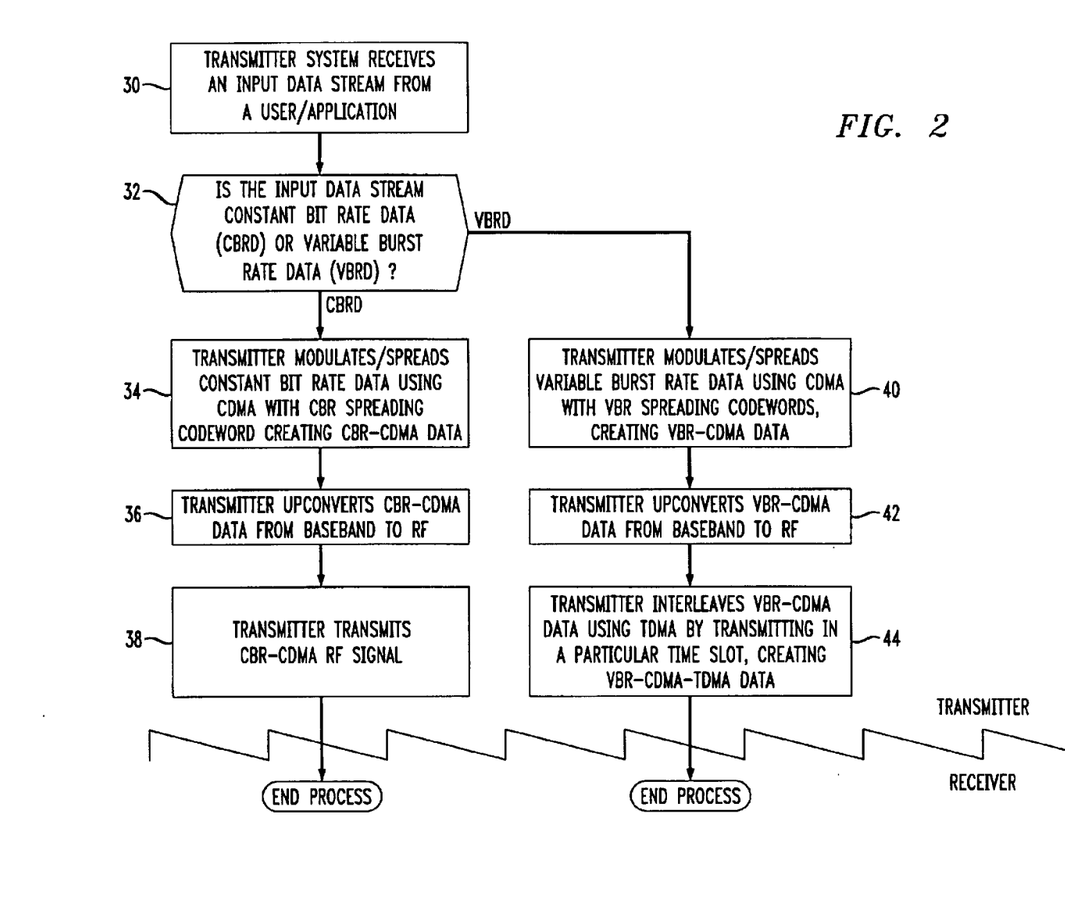
FIG. 2 is a flowchart of the data transmission process for a multiple access implementation of the present invention.

The transmission process for the multiple access implementation of FIG. 1 is shown in FIG. 2. The process shown in FIG. 2 is the process by which a single input data stream is processed and transmitted by a transmitter. By processing multiple input data streams using the process shown, the transmitters transmit CBR data and VBR data in coexistence while maintaining a sufficient Quality-of-Service for both data classes.

Referring now to FIG. 2, the transmitter receives an input data stream from a user/application in step 30. Then, in step 32, it is determined whether the input data stream is of the CBR data class, or the VBR data class. If, at step 32, it is determined that the input data stream is CBR data, then the process proceeds to step 34.

At step 34, the CBR data stream is spread using CDMA with CBR spreading factor codewords. The transmitter then upconverts this CBR-CDMA data from baseband to RF for transmission in step 36. The transmitter further transmits the CBR-CDMA RF data at step 38.

If, at step 32, it is determined the input data stream is VBR data, then the process proceeds to step 40. In step 40, the VBR data stream is spread using CDMA with VBR spreading factor codewords. The transmitter then upconverts this VBR-CDMA data from baseband to RF for transmission in step 42. The transmitter further transmits the VBR-CDMA RF data in bursts during specific time slots at step 44. Thus, the individual VBR-CDMA RF data stream is interleaved with other individual VBR-CDMA RF data streams using TDMA in step 44.

Figure 3:
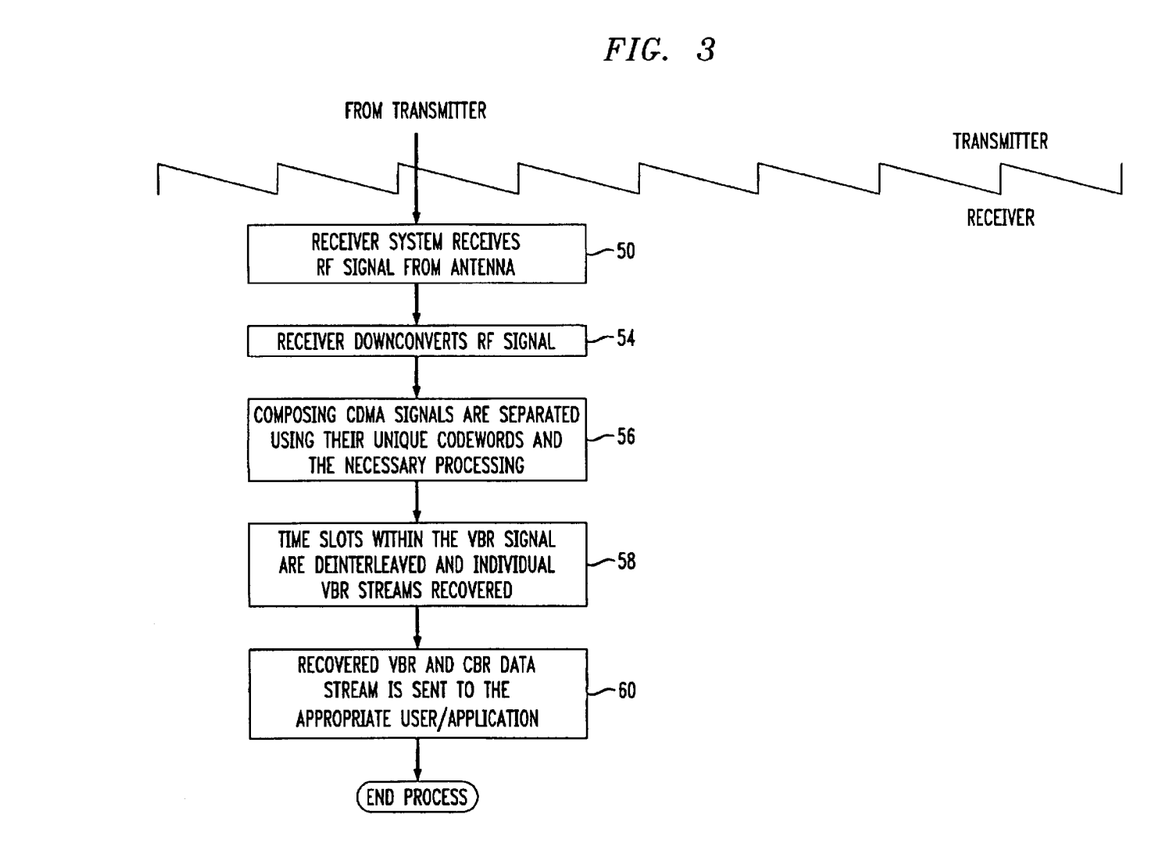
FIG. 3 is a flowchart of the data reception process for a multiple access implementation of the present invention.

The receiver reception process for the multiple access implementation of FIG. 1 is shown in FIG. 3.

Referring now to FIG. 3, the receiver receives a RF signal from an antenna in step 50. The method of separating the signals into CBR and VBR includes downconverting the received RF signal, then despreading and separating the VBR component and the CBR components by their unique spreading codewords, and later deinterleaving the time slots within the VBR component.

At step 54, the receiver downconverts the received signal. The receiver then despreads and separates the CBR-CDMA and VBR-CDMA signals using the appropriate spreading codewords and the necessary signal processing in step 56. Detection and separation of multiple CDMA signals has been a topic of intense research over the last decade and a large body of work exists. Numerous techniques can be applied here depending on the affordable level of complexity.

At step 58, the receiver deinterleaves the received VBR-CDMA-TDMA component using TDMA. Thus, the receiver extracts every individual data stream from its corresponding time slot, thereby recovering the various VBR data streams.

Finally, the receiver sends the recovered VBR and CBR data streams to the appropriate user/applications in step 60.

Figure 4:
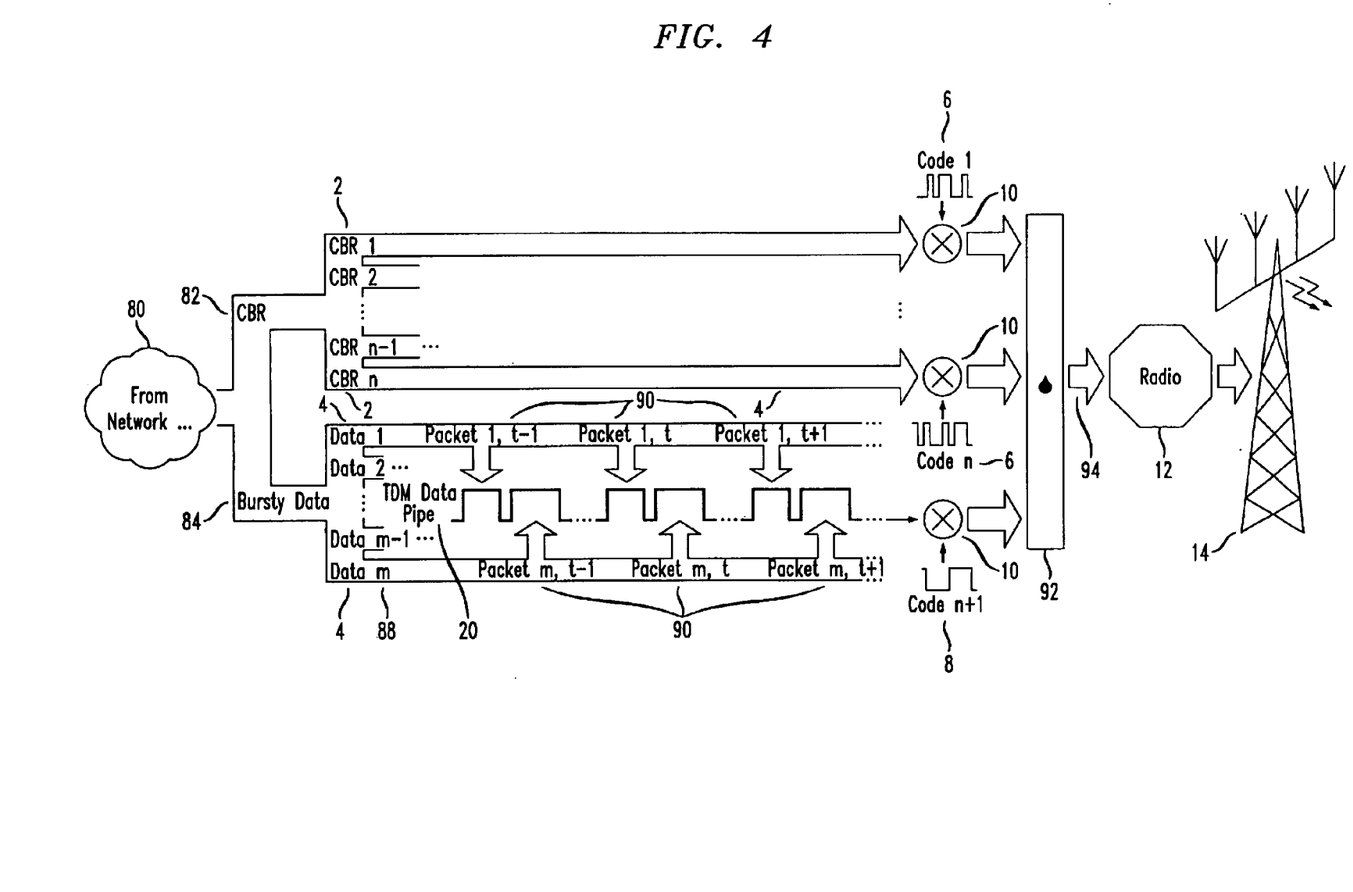
FIG. 4 is a diagram of the data transmission architecture for a multiplexing implementation of the present invention.

The architecture of a multiplexing (single transmitter and many receivers) implementation of the present invention is shown in FIG. 4. In the multiplexing architecture, the transmitter performs TDM of VBR data first, thereby creating VBR-TDMA data, which is then spread using CDM with VBR spreading factors to create VBR-TDM-CDM data. The transmitter also spreads CBR data using CDM with CBR spreading factors, thereby creating CBR-CDM data, which is combined with the VBR-TDM-CDM data. The combined CBR-CDM data and VBR-TDM-CDM data is then upconverted to the appropriate RF carrier frequency and transmitted by the transmitter.

Referring now to FIG. 4, the transmitter is connected to a network 80 or similar data source which provides CBR data 82 and VBR data 84. CBR data 82 includes multiple CBR data streams 2, which are spread by modulator 10 using CDM with a CBR spreading code 6, thereby creating CBR-CDM data streams.

VBR data 84 includes multiple VBR data streams 4, which are first interleaved by modulator 88 using TDM into a TDM signal 20. The transmitter interleaves the VBR data streams 4 by inserting VBR data packets 90 into individual time slots within the TDM signal 20. Thus, the transmitter interleaves multiple VBR data streams 4 into a single TDM signal 20, which includes VBR-TDMA data.

After interleaving multiple VBR data streams 4 into a single TDM signal 20, that signal is spread by modulator 10 using CDM with a VBR spreading code 8, thereby creating a VBR-TDM-CDM signal component. This VBR-TDM-CDM signal component is combined with CBR-CDM signals components by adder 92 into an aggregated signal 94, which is then upconverted from baseband to RF by RF modulator 12. The receiver further sends this resulting RF signal to the transmitter antenna 14, which transmits the RF signal.

Multiple receivers receive the RF transmission and recover their intended CBR data streams 2 and/or VBR data streams 4, which are sent to the appropriate users and applications. Similarly to FIG. 1, the notation of code 1, code n and code n+1 indicates that these values are different.

Figure 5:
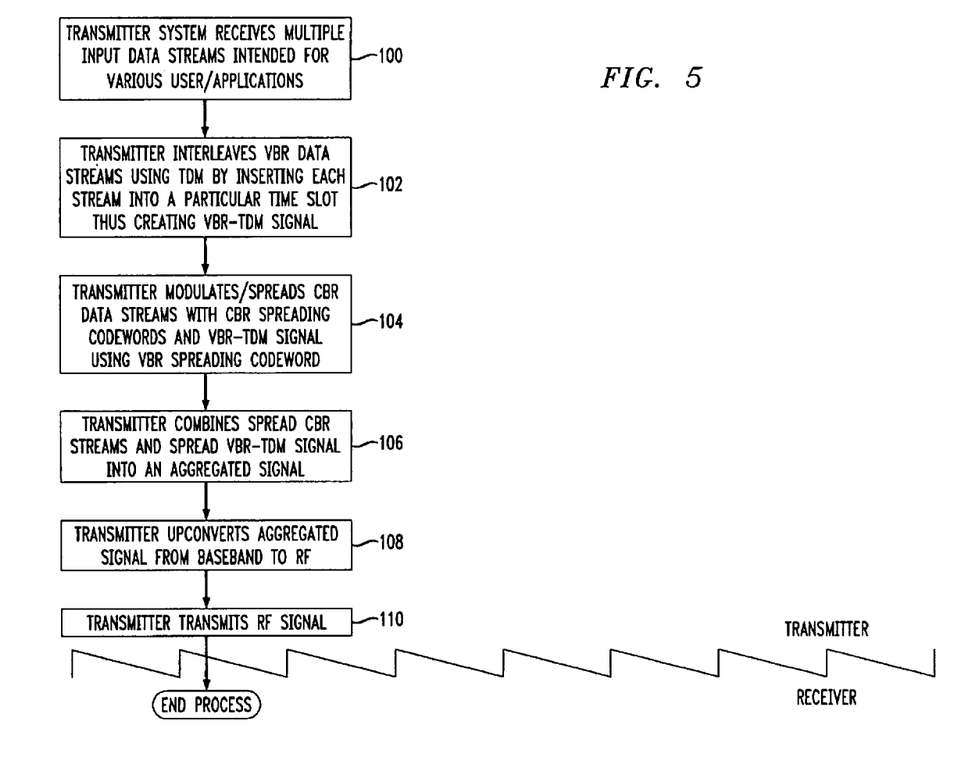
FIG. 5 is a flowchart of the data transmission process for a multiplexing implementation of the present invention.

The transmitter transmission process for the multiplexing architecture of FIG. 4 is shown in FIG. 5. Referring now to FIG. 5, the transmitter receives multiple data stream intended for different users/applications in step 100. At step 102, the transmitter interleaves the VBR Data by inserting every VBR stream in an individual time slot, thereby creating a VBR-TDM signal. At step 104, the system spreads the CBR data streams using CBR spreading factor codewords and the VBR-TDM signal using the VBR spreading.

Finally, the transmitter combines the spread CBR data streams and the spread VBR-TDM signal into a single signal for transmission in step 106. The transmitter then upconverts this resulting signal from baseband to RF for transmission in step 108. The transmitter further transmits this RF signal in 110.

Figure 6:
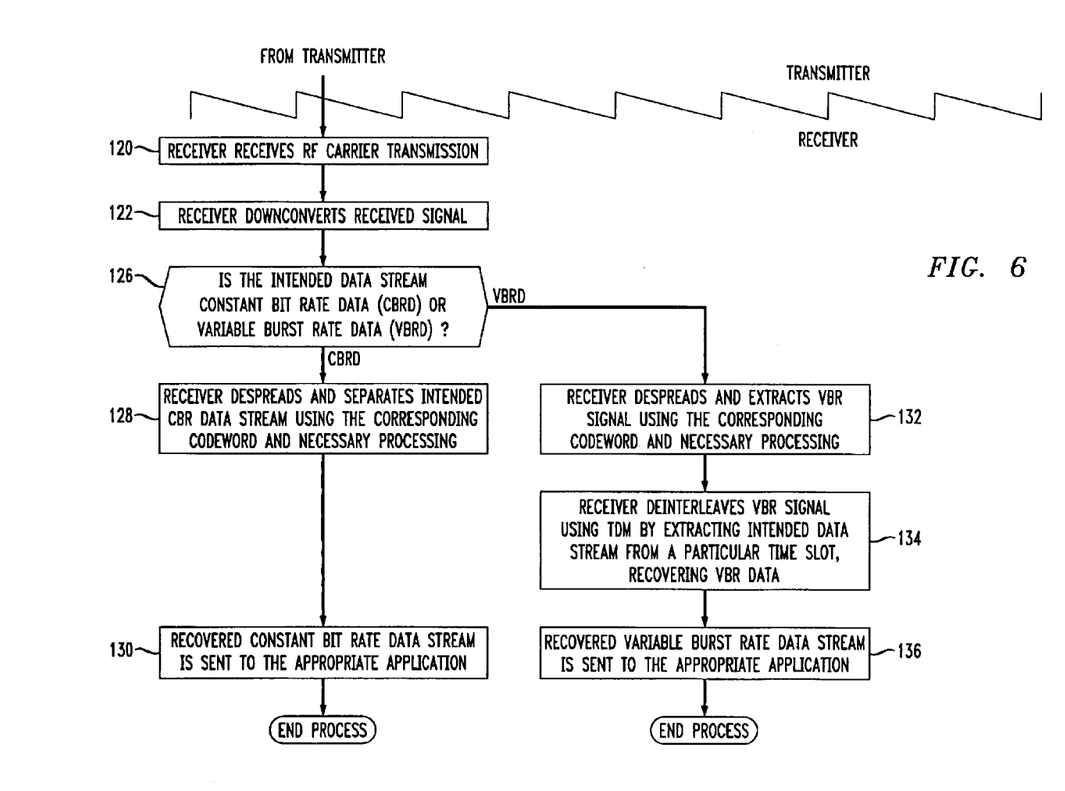
FIG. 6 is a flowchart of the data reception process for a multiplexing implementation of the present invention.

The receiver reception process for the multiplexing implementation of FIG. 4 is shown in FIG. 6. The process shown in FIG. 6 is the process by which a single data stream is recovered by a receiver. By applying such processing for every intended application at every intended receiver, all CBR data and VBR data streams can be recovered while maintaining a sufficient Quality-of-Service for both data classes.

Referring now to FIG. 6, the receiver system receives the RF signal from an antenna in step 120. The receiver then downconverts the received RF signal in step 122.

At step 126, it is determined if the intended data stream for that particular application is CBR data or VBR data. If, at step 126, it is determined that the intended data stream is CBR data, the process proceeds to step 128. At step 128, the receiver despreads and separates the intended CBR data stream using the corresponding CBR spreading codeword and the necessary processing, thereby recovering the original CBR data stream. The receiver then sends the recovered CBR data stream to the appropriate application in step 130.

If, at step 126, it determined that the intended data stream is VBR data, the process proceeds to step 132. At step 132, the receiver despreads and separates the VBR-TDM signal using the corresponding spreading codeword, thereby recovering the VBR-TDM signal. The transmitter then deinterleaves the VBR-TDMA signal by extracting the desired VBR data from its individual time slot in step 134. Thus, the receiver recovers the original VBR data stream from the VBR-TDM data stream using TDM in step 134. The receiver further sends the recovered VBR data stream to the appropriate application in step 136.

The present invention includes a number of features and applications that are apparent to those skilled in the art. One feature of the present invention is the ability to communicate a single data stream of CBR data or VBR data using either CDM/CDMA with a certain spreading factor, or CDM/CDMA with a certain spreading factor and TDM/TDMA, respectively, even though there is only one data stream. This circumstance occurs when only a single application or user is inputting data into the communication system, but is also possible in other embodiments that accept only a single input data stream.

Thus, although the preferred embodiment of the present invention describes the advantages and efficiencies of the present invention when transmitting multiple data streams simultaneously, those same advantages of the present invention exist in communication systems where there is only one input data stream to the system.

Another feature of the present invention is its ability to track and analyze shifts in the data flow of a single data stream from CBR data to VBR data, or vice versa, and adjust the communication method accordingly. A shift in a data stream could occur, for example, for Internet applications where a user surfs the Internet at spurious intervals, creating a VBR data signal, but then initiates a teleconference, thereby shifting the data stream to CBR data. The present invention can track the data stream transmission, determine that the data stream class has shifted from VBR data to CBR data, and make the corresponding shift in communication method. Similarly, the present invention can track the data stream transmission, determine that the data stream class has shifted from CBR data to VBR data, and make the corresponding shift in communication method.

Yet another feature of the present invention is the ability to embody a more basic communication system by using only TDM/TDMA to multiplex VBR data. Such a system is an alternative to the more complex, preferred embodiment, wherein both CDM/CDMA with a certain spreading factor and TDM/TDMA are used to communicate VBR data. A more basic system including only TDM/TDMA interleaving of VBR data would not realize the additional benefits of the spreading using CDM/CDMA with a certain spreading factor, but would also be less complex and less expensive to design and implement.

A further feature of the present invention is the ability to adjust the spreading factor used for CDM/CDMA spreading of CBR data and VBR data. Although the preferred embodiment describes spreading of CBR data and VBR data with (in general different) spreading factors, a feature of the present invention is the ability to adjust the spreading factors dynamically and according to the method implementation. For a basic system which uses only TDM/TDMA to interleave VBR data, it is obvious that the "VBR spreading code" used by the system is no spreading code, because there is no CDM/CDMA spreading of VBR data.

Another feature of the present invention is the ability to communicate CBR data and VBR data simultaneously in additional systems other than wireless systems. Although the preferred embodiment describes a wireless communication system which includes multiple users and applications that transmit data via RF from the transmitter to a receiver, the present invention herein described is generally applicable to both wireless (e.g. cellular communications systems, satellite communication systems, microwave communication systems) and wireline communication systems (e.g. DSL, Cable Modems, fibre optics). Thus, although the preferred embodiment herein describes wireless communication of CBR data and VBR data over RF, the present invention is not limited to such an embodiment, but is generally applicable to wireless and wireline data communication systems.

While the invention has been particularly shown and described with reference to preferred embodiments thereof, it will be understood by those skilled in the art that various changes in form and details may be made therein without departing from the spirit and scope of the invention.

I claim:

1. A method of communicating Constant Bit Rate ("CBR") data and Variable Burst Rate ("VBR") data in a single RF carrier via a communication system, said method comprising the steps of:

determining whether the data stream is CBR or VBR;

when said data stream is CBR, communicating the CBR data stream using Code Division Multiplexing/Code Division Multiple Access ("CDM/CDMA") with first spreading factor codewords, whereby a CBR-CDMA data signal is generated; and when said data stream is VBR data, communicating the VBR data stream using Time Division Multiplexing/Time Division Multiple Access ("CDM/CDMA") and CDM/CDMA with second spreading factor codewords, wherein said second spreading factor codewords comprise a dynamic parameter determined from a required Signal-to-Interference Ratio of said VBR data stream and an amount of power remaining of a total power budget after power allocation to said CBR data stream.

2. The method according to claim 1, wherein the step of communicating the CBR data stream using CDM/CDMA comprises the steps of:

spreading the CBR data stream at a transmitter using CDM/CDMA with the first spreading factor codewords; and transmitting the CBR-CDM or CBR-CDMA data signal in an allocated transmission channel.

3. The method according to claim 1, wherein the step of communicating the VBR data stream using TDM/TDMA and CDM/CDMA comprises the steps of:
spreading the VBR data stream at a transmitter using CDM/CDMA with the second spreading factor codewords; and
transmitting the VBR-CDMA data signal in an allocated transmission channel.

4. The method according to claim 1, wherein the step of communicating the VBR data stream using TDM/TDMA and CDM/CDMA comprises the steps of:
spreading the VBR data stream at a transmitter using CDM/CDMA with the second spreading factor codewords;
placing the VBR-CDMA data signal in data packets;
interleaving the data packets with TDM/TDMA to generate a VBR-CDMA-TDMA data signal; and
transmitting the VBR-CDMA data signal in an allocated transmission channel to a receiver.

5. The method according to claim 1, wherein said step of communicating the VBR data stream using TDM/TDMA and CDM/CDMA further comprises the steps of:
despreading and extracting such signal using the corresponding first spreading factor codeword and necessary processing.

6. The method according to claim 4, wherein said step of communicating the CBR data stream using CDM/CDMA further comprises the steps of:
despreading and extracting the CBR-CDM or CBR-CDMA data signal using the corresponding first spreading factor codeword and necessary processing.

7. The method according to claim 1, wherein said step of communicating the VBR data stream further comprises the steps of:
spreading the VBR data stream at a transmitter using CDM/CDMA with the second spreading factor codewords;
placing the spread VBR-CDM or VBR-CDMA data signal in data packets;
interleaving the data packets with TDM/TDMA into a single TDM/TDMA data signal to generate a VBR-TDM-CDM or VBR-TDMA-CDMA data signal; and
transmitting said data signal in en allocated transmission channel to a receiver.

8. The method according to claim 4, wherein said step of communicating the VBR data stream using TDM/TDMA and CDM/CDMA comprises the steps of:
despreading the VBR-TDM-CDM or VBR-TDMA-CDMA data signal using the second spreading factor codeword and necessary processing; and
deinterleaving the VBR-TDM-CDM or VBR-TDMA-CDMA data signal with TDM/TDMA.

9. The method according to claim 1, wherein the first spreading factor codewords are calculated based on the data rate required for the corresponding applications and the second spreading factor codeword is calculated based on the available transmission power after the necessary power has been allocated to all those signals using the first spreading factor codewords.

10. The method according to claim 4, wherein the first spreading factor codewords are calculated based on the data rate required for the corresponding applications and the second spreading factor codeword is calculated based on the available transmission power after the necessary power has been allocated to all those signals using the first spreading factor codewords.

11. The method according to claim 1, wherein said communication system simultaneously accepts CBR and VBR data streams, the CBR and VBR data streams being communicated as an aggregated signal.

12. The method according to claim 11 further comprising the steps of:
modifying the first spreading factors codewords on-the-fly for the CBR portion of the aggregated signal; and
modifying the second spreading factor codewords on-the-fly for the VBR portion of the aggregated signal.

13. The method according to claim 1 wherein the first spreading factor codewords are the same as the second spreading factor codewords.

14. A communication system for communicating CBR data and VBR data in a single data stream composing:
a transmitter for determining whether the data is CBR and VBR;
if said data stream comprises CBR, the transmitter communicating the CBR data stream using CDM/CDMA with first spreading factor codewords, whereby a CBR-CDM or CBR-CDMA data signal is generated; and
if said data stream comprises VBR, the transmitter communicating the VBR data stream using TDM/TDMA and CDM/CDMA with second spreading factor codewords, whereby a VBR-TDM-CDM or VBR-TDMA-CDMA data signal is generated, wherein said second spreading factor codewords comprise a dynamic parameter determined from a required Signal-to-Interference Ratio of said VBR data stream and an amount of power remaining of a total power bucket after power allocation to said CBR data stream.

15. The communication system according to claim 14, further comprising:
the transmitter spreading the CBR data stream using CDM/CDMA with the first spreading factor codewords.

16. The communication system according to claim 14, further comprising:
the transmitter spreading the VBR date stream using CDM/CDMA with the second spreading factor codewords.

17. The communication system according to claim 14, further comprising:
the transmitter spreading the VBR data stream using CDM/CDMA with the second spreading factor codewords, placing the VBR-CDM or VBR-CDMA data signal in data packets and interleaving the data packets with TDM/TDMA to generate a VBR-TDM-CDM or VBR-CDMA-TDMA data signal.

18. The communication system according to claim 17, further comprising:
if the intended signal is a CBR-CDMA or VBR-CDMA data signal a receiver despreading the CBR-CDM or CBR-CDMA data signal using CDM/CDMA with the first spreading factor codewords.

19. The community system according to claim 17, further comprising:
if the intended signal is a CBR-CDM or CBR-CDMA data signal, a receiver despreading the CBR-CDM or CBR-CDMA data signal using CDM/CDMA with the first spreading factor codewords.

20. The communication system according to claim 14, further comprising:
the transmitter spreading the VBR data stream using CDM/CDMA with the VBR spreading factor codewords, placing the VBR-CDM or VBR-CDMA data signal in data packets and interleaving the data packets with TDM/TDMA to generate a VBR-TDM-CDM or VBR-TDMA/CDMA data signal.

21. The communication system according to claim 17, further comprising:

if the intended signal is a VBR data stream, a receiver despreading the VBR-TDM-CDM or VBR-TDMA-CDMA data signal using CDM/CDMA with the second spreading factor codewords; and the receiver deinterleaving the VBR-TDM or VBR-TDMA data signal with TDM/TDMA.

22. The method according to claim 14, wherein the first spreading factor codewords are calculated based on the data rate required for the corresponding applications and the second spreading factor codeword is calculated based on the available transmission power after the necessary power has been allocated to all those signals using the first spreading factor codewords.

23. The method according to claim 17, wherein the first spreading factor codewords are calculated based on the data rate required for the corresponding applications and the second spreading factor codeword is calculated based on the available transmission power after the necessary power has been allocated to all those signals using the first spreading factor codewords.

24. The communication system according to claim 14 wherein said communication system simultaneously accepts CBR and VBR data streams the CBR and VBR data streams being communicated as a single aggregated signal.

25. The communication system according to claim 24, further comprising:

the transmitter modifying the first spreading factors codewords on-the-fly for the CBR portion of the aggregated signal; and the transmitter modifying the second spreading factor codewords on-the-fly for the VBR portion of the aggregated signal.

26. The communication system according to claim 14 wherein the first spreading factor codewords are the same as the second spreading factor codewords.

\* \* \* \* \*